United States Patent Office.

DANIEL A. DRAPER, OF CAMBRIDGE, MASSACHUSETTS.

Letters Patent No. 112,562, dated March 14, 1871.

IMPROVEMENT IN THE PROCESSES OF MANUFACTURING TYPE-BLOCKS.

The Schedule referred to in these Letters Patent and making part of the same.

*To all whom it may concern:*

Be it known that I, DANIEL A. DRAPER, of Cambridge, in the county of Middlesex and State of Massachusetts, have invented certain Improvements in the Art of Manufacturing Type-Blocks for Hand-Stamps and other purposes; and I hereby declare the following to be a full, clear, and exact description thereof.

Type-blocks for hand-stamps, &c., have been formed by forcing the metal or blank into sectional metal dies held securely in place by suitable mechanical devices, as set forth in Letters Patent of the United States granted to me on the 7th day of May, A. D. 1867.

The metal or blank was, however, operated upon in a cold state, and, owing to its being necessarily hard to produce a durable type-block, the blank required to be subjected to repeated blows, each blow so hardening the blank that it became necessary to remove it from the dies and anneal it before again submitting it to pressure.

To avoid the time and labor involved in thus forming the block from the blank in a cold state is the object of my invention, which consists in heating the metal or blank, as hereinafter described, and subjecting it to a blow or pressure while in such heated state, whereby the type, letters, figures, or other characters can be formed thereon by flowing or forcing the metal into the dies by a single blow of the hammer or action of the press; also, in repeating the blow of the hammer or operation of the press upon the type-block or wheel when contracted by cooling, whereby the block or wheel is again expanded so as to fill the dies, the metal employed being of such a nature that, when brought to or beyond a red heat, it will not be fractured when submitted to a blow or pressure.

To enable others skilled in the art to understand and use my invention, I will proceed to describe the manner in which I have carried it out.

The blank from which the type-block is to be made is cut or otherwise formed out of a metal possessing the proper degree of hardness, firmness, and malleability, and which, when at or beyond a red heat, will not be fractured when submitted to a blow or pressure. I have found yellow or sheathing metal to be best suited for the purpose.

The blank is brought to a proper heat, which is at least red-heat, and more usually beyond a red-heat, the degree of heat being such that the metal may be flowed or forced by the blow of the hammer or operation of the press into the dies, so as to fill them. It is then placed within the space inclosed by a series of four or more sectional dies, which is arranged and securely held in place upon a suitable bed, as described by me in my aforesaid Letters Patent of May 7, A. D. 1867, or in any other well-known manner.

The blank, while still heated to the degree above indicated, is submitted to a single blow of a hammer or operation of a press, which is sufficient to force the metal into and entirely fill the cavities in the dies, and, as the metal contracts somewhat in cooling, it is necessary, in order to insure the production of type, letters, figures, or characters with a sharp and distinct outline, which will not require any subsequent finishing to render them suitable for printing, to repeat the blow of the hammer or operation of the press, so as to expand the block and again fill the dies, as before mentioned. I am thus enabled to avoid the loss of time and labor incident to the old method, when the blank was required to be frequently annealed and subjected to repeated blows.

*Claim.*

I claim—

The herein-described process of manufacturing type-blocks or wheels; that is to say, heating the metal or blank to the degree indicated, subjecting it to the blow or pressure in the dies while in such heated state, and then repeating the blow or pressure upon the block after it has cooled and while it is in the dies, substantially as and for the purposes set forth.

DANIEL A. DRAPER.

Witnesses:
N. W. STEARNS,
P. E. TESCHEMACHER.